United States Patent
Jensen et al.

(10) Patent No.: US 7,570,211 B1
(45) Date of Patent: Aug. 4, 2009

(54) DIGITAL BEAMFORMING METHOD AND APPARATUS FOR POINTING AND NULL STEERING WITHOUT CALIBRATION OR CALCULATION OF COVARIANCE MATRIX

(75) Inventors: Dana J. Jensen, Marion, IA (US); Thomas A. Courtade, Los Angeles, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 12/079,093

(22) Filed: Mar. 25, 2008

(51) Int. Cl.
*G01S 3/16* (2006.01)
(52) U.S. Cl. ........................ 342/378; 342/372
(58) Field of Classification Search ............ 342/81, 342/154, 157, 372–373, 378, 382
See application file for complete search history.

(56) References Cited

U.S. PATENT DOCUMENTS

| | | | |
|---|---|---|---|
| 5,459,668 A * | 10/1995 | Dogan et al. | 701/223 |
| 6,771,220 B1 | 8/2004 | Ashe et al. | 342/417 |
| 7,042,860 B2 | 5/2006 | Kasami et al. | 370/334 |
| 7,286,855 B2 * | 10/2007 | Raleigh et al. | 455/562.1 |
| 2008/0025446 A1 * | 1/2008 | Van Wechel et al. | 375/350 |

* cited by examiner

*Primary Examiner*—Dao L Phan
(74) *Attorney, Agent, or Firm*—Daniel M. Barbieri

(57) ABSTRACT

The method and system provides an improvement in signal to noise plus interference without utilizing a calculated covariance matrix or calibrated antenna array, and does not require knowledge of the array geometry. The system utilizes the cross correlation of the output of each antenna element to estimate a weight vector for resolving a signal in a multiple simultaneous source environment.

17 Claims, 6 Drawing Sheets

DIGITAL BEAMFORMING METHOD AND APPARATUS FOR POINTING AND NULL STEERING WITHOUT CALIBRATION OR CALCULATION OF COVARIANCE MATRIX

FIELD OF INVENTION

This invention relates to digital beamforming (DBF) and more particularly to an improved system and apparatus for wireless communication while minimizing signal to noise plus interference (SINR).

BACKGROUND OF THE INVENTION

Multi-element antenna arrays with digital beamforming capability offer options for receiving one or more simultaneous transmissions. Some standard DBF methods rely on first and second order statistics, that is, a cross correlation vector and covariance matrix. The minimum mean squared error (MMSE) method utilizes cross correlation vectors and covariance matrices to calculate a weight vector in order to minimize signal to noise plus interference (SINR) from a combined signal. The MMSE weight vector can be calculated, $$w = R_x^{-1} r_{xy},$$

where the covariance is denoted $R_x$ and cross correlation $r_{xy}$.

Calculating a covariance matrix is processor and system intensive. Signals arriving at each element must be correlated with all other signals. To obtain accurate statistics, the correlation length can be relatively long, particularly in the presence of significant co-channel interference in networks allowing multiple simultaneous transmission/reception. For example, in an array of $N_{element}$ elements (assuming Hermitian symmetry) calculating the upper triangle and diagonal of the covariance requires $N_{cov\_corr}$ results in:

$$N_{cov\_corr} = N_{element}^2/2 + N_{element}/2.$$

For a 4×4 array of 16 elements, this requires 136 correlations of receive signals.

Depending on the array size and correlation duration, calculating the covariance matrix can require significant hardware capability (e.g. multipliers and/or memory). Also, since all signals must be available to correlate with all other signals, a common processor or complicated multiplexing system would be required.

Additionally, calibrating a phased array antenna can be challenging. Depending on the accuracy required of the calibration and the components that affect calibration, either multi-dimensional lookup tables and/or 'realtime' calibration are necessary. Some examples of calibration issues include changes with time, temperature, frequency, gain, and direction of arrival (DOA) and mutual coupling. A system and apparatus requiring neither significant hardware capability (common processor or complicated multiplexing) nor antenna calibration would be beneficial. Although the MMSE method does not require calibration, other methods, such as those that rely on pointing and null placement typically require calibration. Calibration errors can significantly affect the depth of a null placed on a given transmit source.

A combining technique that does not require calibration or calculation of a covariance matrix would be valuable.

SUMMARY OF THE INVENTION

In a network allowing multiple simultaneous independent beams and/or multiple simultaneous transmit sources, DBF receiver apparatus can be used to allow reception of one or more simultaneous sources. Many DBF methods require calibration of the receive antenna array, knowledge of antenna geometry, and/or calculation of a covariance matrix. Calibration can depend on many factors and may require multi-dimensional lookup tables and/or semi-realtime calibration. Calculating the covariance matrix by correlating signals received at each antenna element against those on all other elements can be expensive to implement in hardware, particularly for large arrays. An alternative method to determine DBF weight is disclosed that does not require calibration, knowledge of antenna geometry, or direct calculation of the covariance matrix.

The presently disclosed system and apparatus allows an antenna array to be pointed toward a signal of interest and then place nulls on any other known signal without requiring knowledge of signal DOA. Thus, signal DOA estimates requiring a calibrated array and knowledge of array geometry are not required.

The foregoing summary is illustrative only and is not intended to be in any way limiting. In addition to the illustrative aspects, embodiments, and features described above, further aspects, embodiments, and features will become apparent by reference to the drawings and the following detailed description.

DESCRIPTION OF THE DRAWINGS

The numerous objects and advantages of the present invention may be better understood by those skilled in the art by reference to the accompanying figures in which.

DETAILED DESCRIPTION OF THE INVENTION

Figure 1:
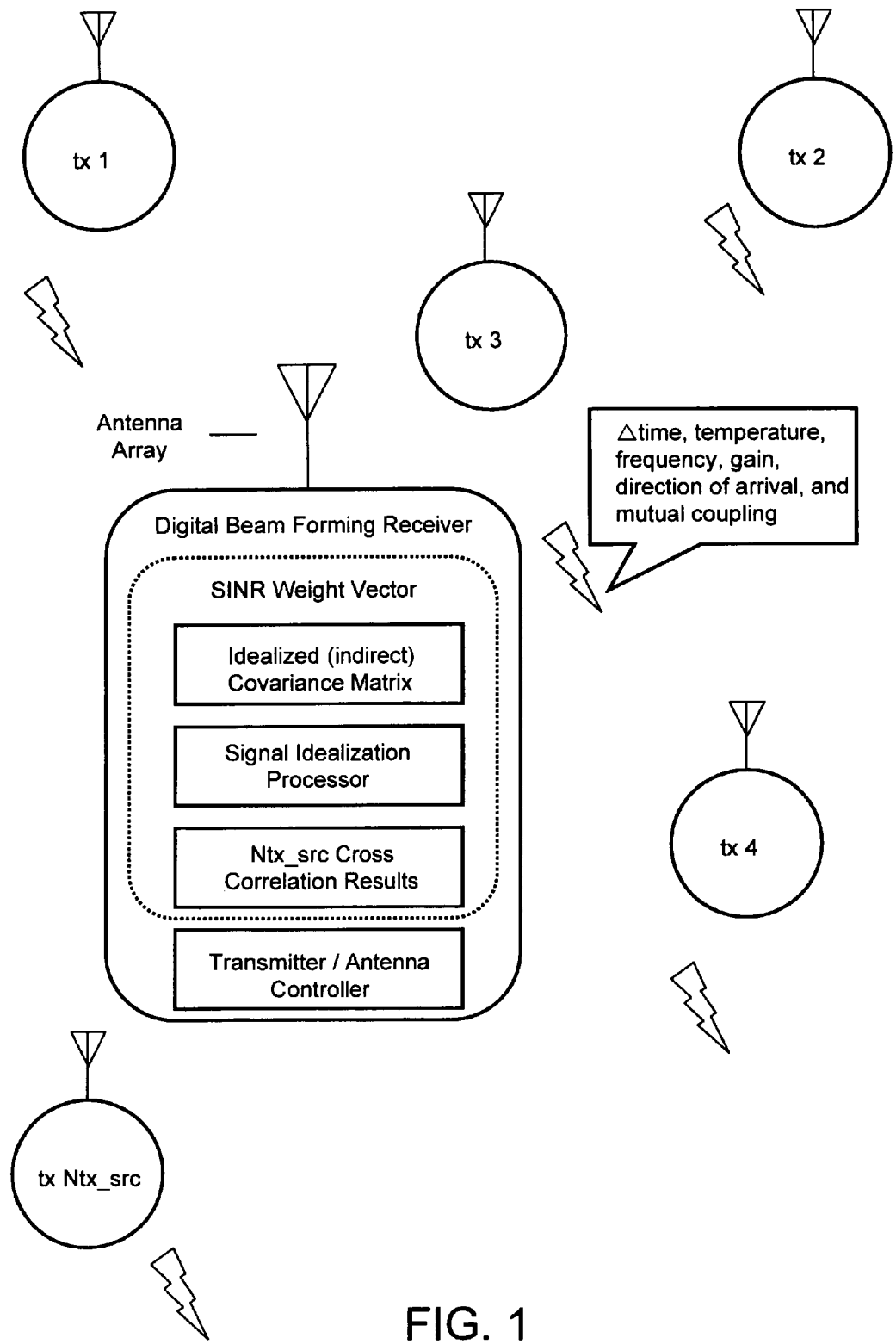
FIG. 1 is a schematic diagram illustrating a network allowing simultaneous multiple transmit signals.
Figure 2:
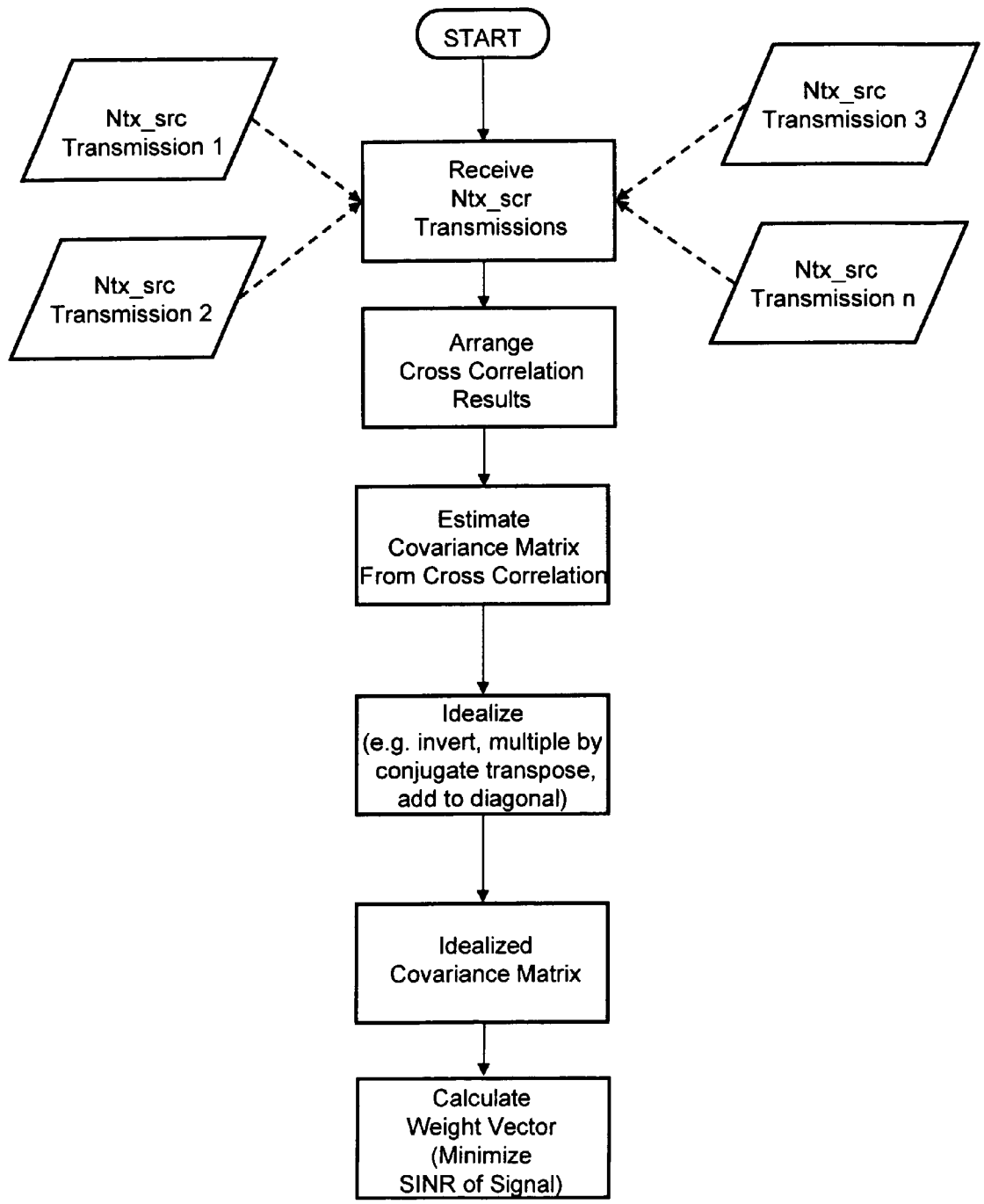
FIG. 2 is a flow diagram illustrating the indirect calculation of an idealized covariance matrix in a simultaneous multiple transmit signal environment which does require direct calculation of a covariance matrix.
Figure 3:
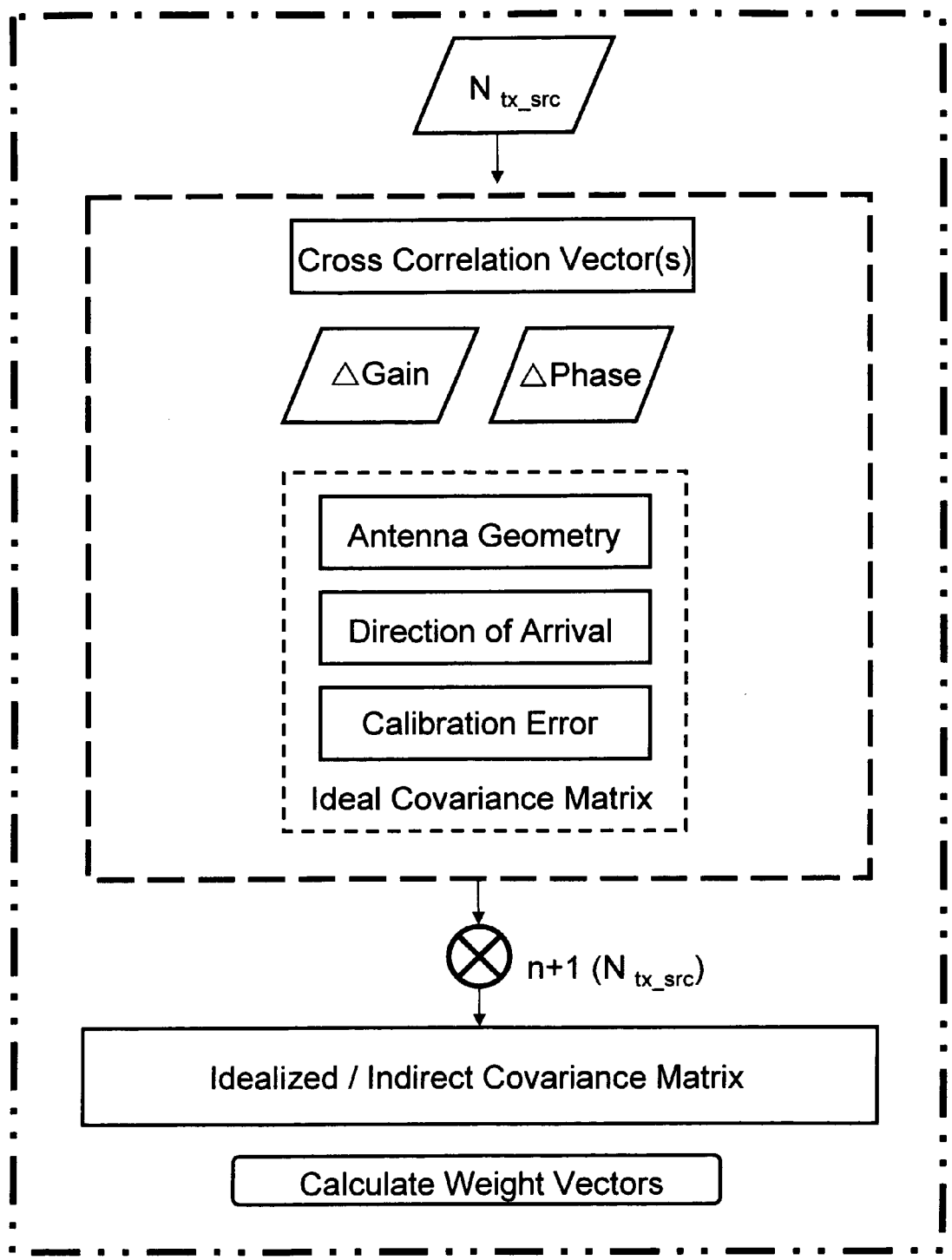
FIG. 3 is a flow block diagram illustrating the system and apparatus processes of the present invention.
Figure 4:
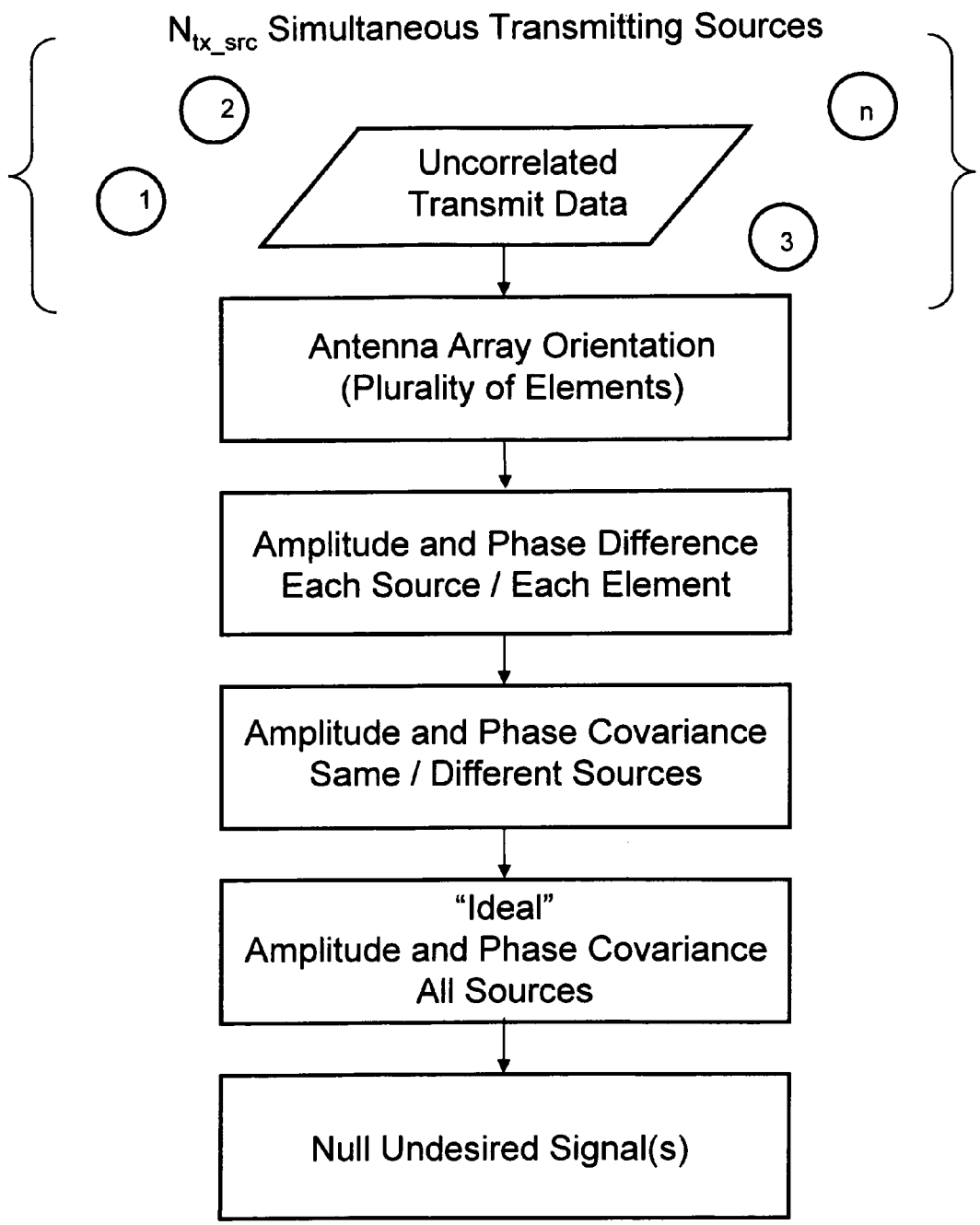
FIG. 4 is a flow diagram illustrating a process of the present invention in a simultaneous multiple transmit signal environment with uncorrelated transmit data received by an antenna array.
Figure 5:
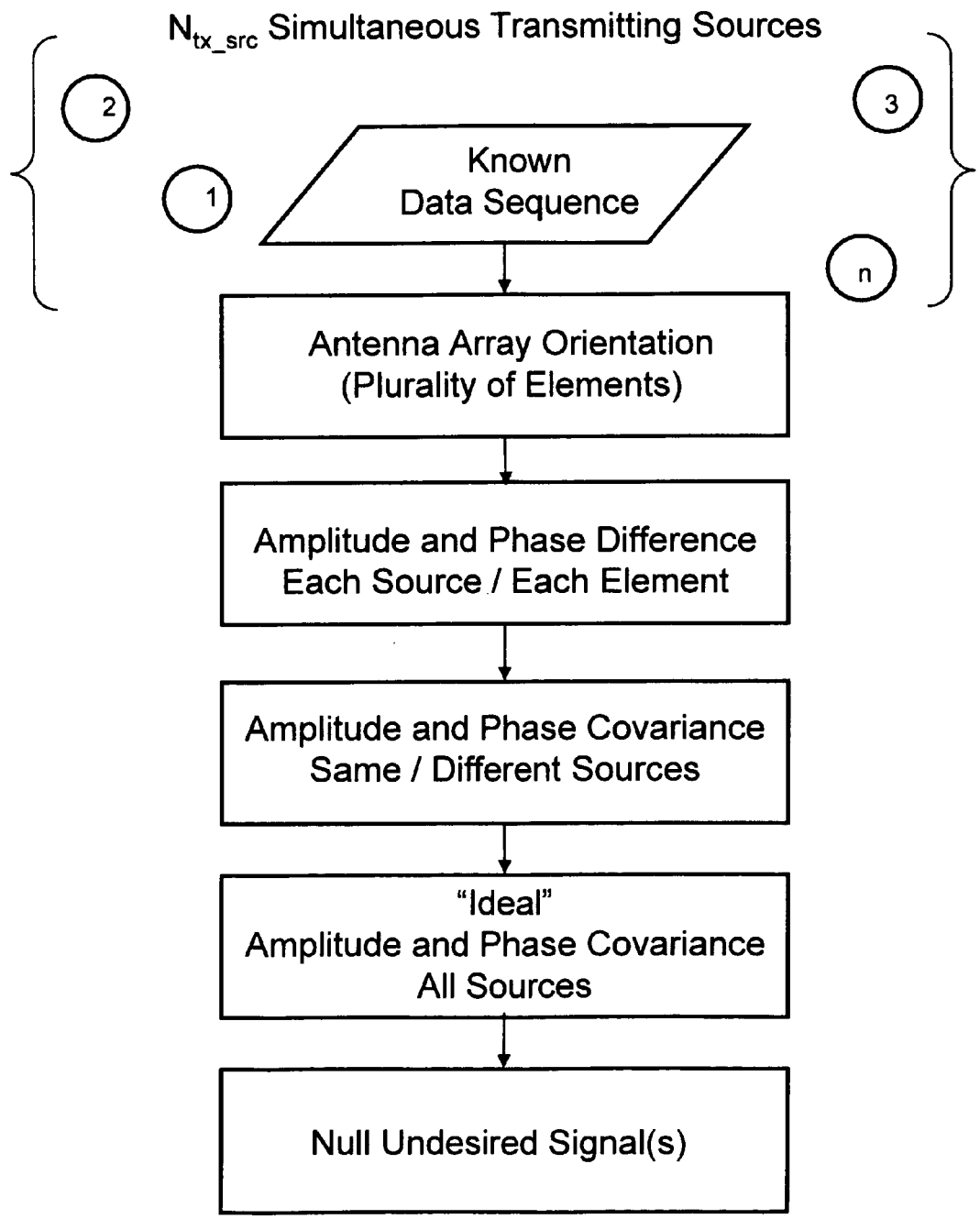
FIG. 5 is a flow diagram (substantially identical to FIG. 4) illustrating a process of the present invention in a simultaneous multiple transmit signal environment with known and repetitive transmit data received by an antenna array.
Figure 6:
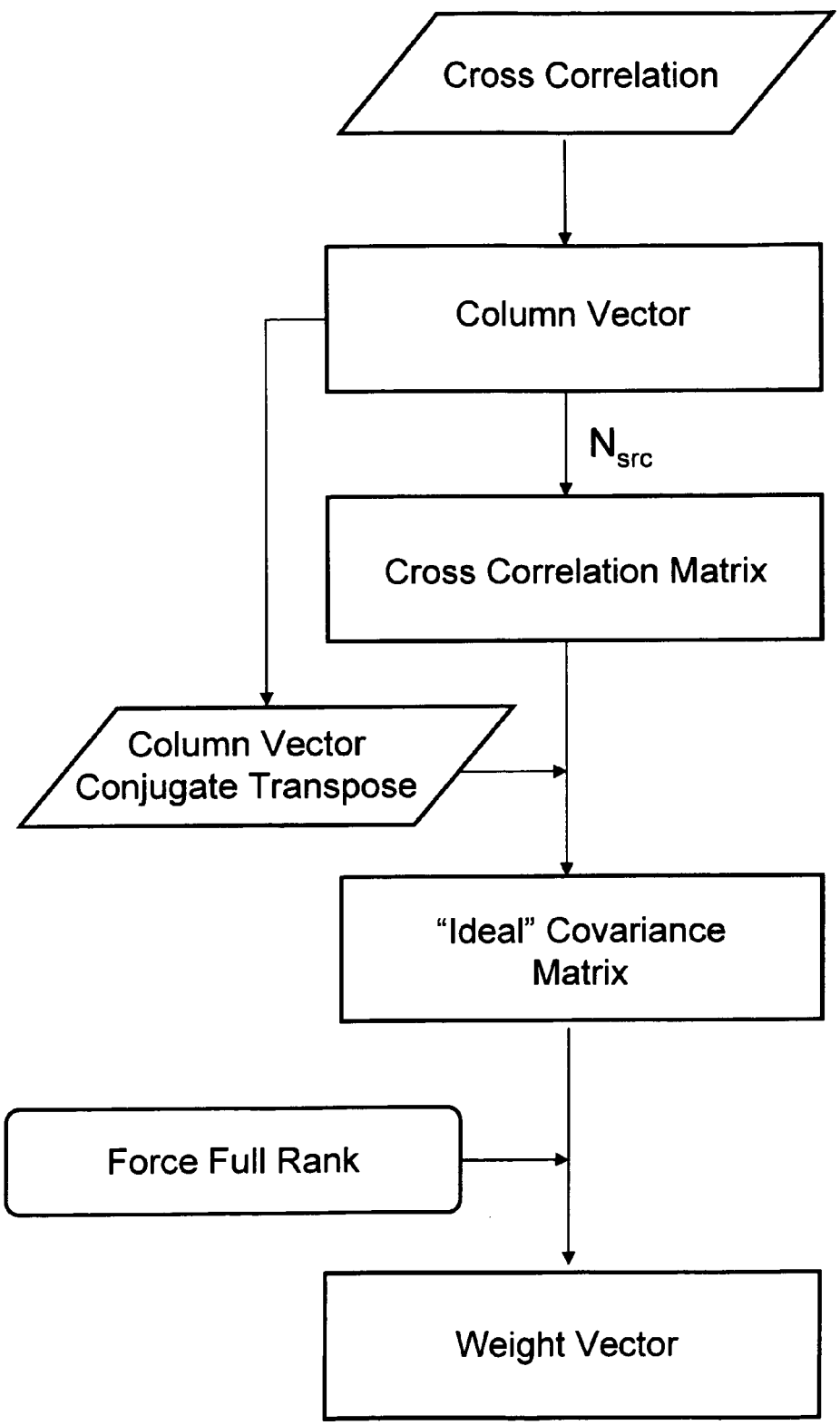
FIG. 6 is a flow diagram of a process of the present invention illustrating the calculation of a weight vector in accordance with an embodiment of the present invention.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Rather than calculating the covariance matrix explicitly, it is proposed to generate an estimate of it from cross correlation results. This can offer significant savings in hardware, while offering interference cancellation for in-network co-channel interference similar to the MMSE algorithm. Details on the calculations will be provided later in this disclosure.

Given $N_{tx\_src}$ simultaneous sources transmitting, there would be $N_{tx\_src}$ cross correlation results. It is proposed to use these results to estimate a covariance matrix, bypassing the need to calculate the results. The resulting matrix is typically rank deficient and inverting it requires the more involved pseudo-inverse rather than a standard matrix inverse. However, the matrix can be made full rank by adding some relatively small value to the diagonal; this allows the use of the standard inverse.

It was noted that if the amount added to the diagonal to convert it to full rank was 'too small', the inverse did not produce useful results. On the other hand, it was desired to keep the amount added to the diagonal small, to minimize the modification of the matrix. It was found that scaling the amount added to the diagonal relative to the largest value in the rank deficient covariance matrix consistently produced useful results. The largest value is along the diagonal, so the maximum could be selected by comparing only these $N_{element}$ values. This maximum can be scaled and added to each value along the diagonal. For example, it was determined by trial and error that a scaling factor around 1/1000 produced satisfactory covariance inverse results, while dividing the maximum by 10,000 produce marginal results and by 100,000 provided poor results.

As with the MMSE approach, the weight vector can be calculated by multiplying the inverse of the covariance matrix by the cross correlation vector.

A. Estimating Covariance Matrix from Cross Correlation

The cross correlation vector, for a given source, provides gain and phase information. Typically, with beamforming, it is assumed that the correlation coefficient of the fading channel for elements in the array is 1, or near 1. That is, the elements of the array see a propagation channel having the same phase and gain. Therefore, the phase difference between correlation results at different elements is due to antenna geometry, the direction of arrival and un-calibrated receive chain differences. With the antenna separation generally small compared to the propagation distance, the amplitude differences would be expected to be a result of lack of calibration.

Therefore, with $N_{tx\_src}$ transmit sources, there would be $N_{tx\_src}$ cross correlation vectors. The delta-phase and delta-amplitude in a vector account for antenna geometry, DOA, and calibration (including mutual coupling), though it is not necessary to know the individual contribution of each of these.

For each source's cross correlation vector, an 'ideal' covariance matrix can be generated. Using complex multiplication the cross correlation vector can be multiplied by the conjugate transpose of the cross correlation vector to produce an $N_{element} \times N_{element}$ matrix. Using this method, an 'ideal' covariance matrix can be determined for each of the $N_{tx\_src}$ sources. These $N_{tx\_src}$ ideal covariance matricies are summed to produce a single 'ideal' covariance matrix. An equivalent method would be to generate an $N_{element} \times N_{tx\_src}$ matrix from the cross correlation results and multiply by its conjugate transpose to generate the $N_{element} \times N_{element}$ ideal covariance matrix.

More mathematical details are given in the following sub-sections.

B. Covariance Matrix given $N_{tx\_src}$ Transmitters

Consider $N_{tx\_src}$ sources transmitting data sequences $d_m[n]$, $m=1:N_{tx\_src}$, with time index n. The transmit data from the independent sources is uncorrelated. An array of antennas, indexed $i=1:N\_el$, receives the signal from each source. The RF propagation channel and lack of calibration introduces magnitude and phase differences. For source m, element i, this can be expressed, $C_{m,i} e^{j\phi(m,i)}$. Since each element receives from each source, the signal received at each element can be expressed, $$r_i = \sum_{m=1}^{N_{source}} d_m[n] C_{m,i} e^{j\phi_{m,i}}.$$

The covariance between element i and k for all sources m, can be calculated, $$E\{r_i r_k^*\} = E\left\{\left(\sum_{m=1}^{N_{source}} d_m[n] C_{m,i} e^{j\phi_{m,k}}\right)\left(\sum_{m=1}^{N_{source}} d_m[n] C_{m,k} e^{j\phi_{m,k}}\right)^*\right\}.$$

This can be expressed as terms from a common source, $d_m[n] d_m[n]$, and terms from different sources, which will be referred to as cross terms, $d_m[n] d_p[n]$, $m \neq p$, $$E\{r_i r_k^*\} = E\left\{\left(\sum_{m=1}^{N_{source}} d_m[n] d_m^*[n] C_{m,i} e^{j\theta_{m,i}} C_{m,k} e^{-j\phi_{m,k}}\right)\right\} + E\{\text{crossterms}\}.$$

For the cross terms, the expected value of the sum is the sum of the expected values. Taking one term, from sources m and p (for covariance on elements i and k), $$E\{r_{m,i} r_{p,k}^*\} = E\{(d_m[n] C_{m,i} e^{j\phi_{m,i}}) \cdot (d_p^*[n] C_{p,k} e^{-j\phi_{p,k}})\}.$$

The constant magnitude and phase can be brought out of the expectation, leaving $$E\{r_{m,i} r_{p,k}^*\} = C_{m,i} e^{j\phi_{m,i}} C_{p,k} e^{-j\phi_{p,k}} \cdot E\{d_m[n] d_p^*[n]\}.$$

The data streams from the two sources are uncorrelated, so the expected value of the product is the product of the expected values, $$E\{d_m[n] d_p^*[n]\} = E\{d_m[n]\} \cdot E\{d_p^*[n]\}.$$

It is assumed that the data sequences are zero mean, so the expected value of the product of uncorrelated zero-mean sequences is 0, $$E\{d_m[n] d_p^*[n]\} = 0.$$

So the expected value of each cross term is zero, $$E\{r_{m,i} r_{p,k}^*\} = 0.$$

The covariance, with cross terms removed, reduces to, $$E\{r_i r_k^*\} = E\left\{\sum_{m=1}^{N_{source}} d_m^2[n] C_{m,i} e^{j\phi_{m,i}} C_{m,k} e^{-j\phi_{m,k}}\right\}.$$

The normalized data sequences have power of 1, so the equation simplifies to $$E\{r_i r_k^*\} = E\left\{\sum_{m=1}^{N_{source}} C_{m,i} e^{j\phi_{m,i}} C_{m,k} e^{-j\phi_{m,k}}\right\}.$$

An expression for the cross correlation is derived in the next sub-section. For source m, it can be reduced to the channel and calibration phase and magnitude on element i, $$r_{xy,(m,i)} = E\{r_i d_m^*\} = C_{m,i} e^{j\phi_{m,i}}.$$

The covariance for elements i and k can be re-written in terms of the cross correlation results for all sources m, $$E\{r_i r_k^*\} = E\left\{\sum_{m=1}^{N_{source}} r_{xy,(m,i)} \cdot r_{xy,(m,k)}^*\right\}.$$

This is the sum of the 'ideal' covariance between elements i and k for all sources m.

C. Cross Correlation

Each of the sources periodically transmit a known data sequence. The signal received at each element can be correlated with this sequence; the result is the cross correlation vector. It is assumed that the synchronization sequences transmitted from the sources are not aligned at reception, or that the sync sequences are sufficiently long and 'different' (ideally orthogonal) to produce useful results.

Using similar notation as the previous section, the signal received from the transmitting source can be expressed $$r_i = \sum_{m=1}^{N_{source}} d_m[n] C_{m,i} e^{j\phi_{m,i}}.$$

The cross correlation for source p, on element i, can be expressed, $$E\{r_i d_p^*\} = E\left\{\sum_{m=1}^{N_{source}} d_m[n] C_{m,i} e^{j\phi_{m,i}} \cdot d_p^*[n]\right\}.$$

Separating the term from source p from the summation, $$E\{r_i d_p^*\} = E\left\{d_p[n] C_{p,i} e^{j\phi_{p,i}} \cdot d_p^*[n] + \sum_{m=1,m\neq p}^{N_{source}} d_m[n] C_{m,i} e^{j\phi_{m,i}} \cdot d_p^*[n]\right\},$$

and expressing with two expectation operations, $$E\{r_i d_p^*\} = E\{d_p[n] C_{p,i} e^{j\phi_{p,i}} \cdot d_p^*[n]\} + E\left\{\sum_{m=1,m\neq p}^{N_{source}} d_m[n] C_{m,i} e^{j\phi_{m,i}} \cdot d_p^*[n]\right\}.$$

The second term contains the cross terms, where the known sequence for source p is correlated against other sources. In this case, the single cross term can be expressed, $$\text{crossterm} = E\{d_m[n] \cdot d_p^*[n] C_{m,i} e^{j\phi_{m,i}}\}.$$

Bringing the constant phase and magnitude out of the expectation, $$\text{crossterm} = C_{m,i} e^{j\phi_{m,i}} E\{d_m[n] \cdot d_p^*[n]\}$$

but since the sequences $d_m$ and $d_p$ are uncorrelated for all sources m not equal to source p, the expected value of the product is the product of the expected value.

The data sequences are zero mean, both expected values are 0 and all $$\text{crossterm} = C_{m,i} e^{j\phi_{m,i}} E\{d_m[n]\} \cdot E\{d_p^*[n]\}.$$

of the cross terms can be removed.

$$\text{crossterm} = 0.$$

Therefore, the cross correlation, without the cross terms, reduces to $$E\{r_i d_p^*\} = E\{d_p[n] C_{p,i} e^{j\phi_{p,i}} \cdot d_p^*[n]\}.$$

Bringing the constant magnitude and phase out of the expectation, results in, $$E\{r_i d_m^*\} = C_{m,i} e^{j\phi_{m,i}} E\{d_m[n] d_m^*[n]\}.$$

But, the normalized data sequence has a power of 1, $$E\{d_m[n] d_m^*[n]\} = 1,$$

so, the cross correlation result on element i for source m is, $$E\{r_i d_m^*\} = C_{m,i} e^{j\phi_{m,i}},$$

$$r_{xy,(i,m)} = E\{r_i d_m^*\}.$$

D. Summary: Weight Vector from Cross Correlation

Given the cross correlation for source m element i is expressed as a column vector, $$r_{xy,m} = \begin{bmatrix} r_{xy(i=1,m)} \\ r_{xy(i=2,m)} \\ M \\ r_{xy(i=N_{element},m)} \end{bmatrix},$$

the matrix of $N_{src}$ cross correlation results can be expressed as, $$r_{xy} = [r_{xy,1} r_{xy,2} \Lambda r_{xy,N_{src}}],$$

and the 'ideal' covariance can be calculated, $$R_{xx,ideal} = r_{xy} \cdot r_{xy}^H,$$

where $r^H$ is the conjugate transpose of r.

The weight vector for source m is calculated, $$w_m = \left(R_{xx,ideal} + G \cdot \begin{bmatrix} 1 & 0 & \Lambda & 0 \\ 0 & 1 & & \\ M & & O & \\ 0 & & & 1 \end{bmatrix}\right)^{-1} \cdot r_{xy,m}.$$

with G equal to the scaling factor discussed previously.

Note that this is essentially a 'point with null placement' technique. The cross correlation columns used to determine $R_{xx,ideal}$, act as the steering vectors. The point direction for source m is $r_{xy,m}$, and the null directions correspond to the cross correlation vectors of the other sources.

A simple implementation of the present invention may operate, for example, in a multiple simultaneous transmission environment having multiple sources (FIG. 1). For purposes of explanation only, it will be understood that signals arriving at each element of an antenna array are combined in accordance with the method, system, and apparatus of the invention utilizing a weight vector effectively applying some gain and/or phase to the signal received at each antenna array element. These weight vector combined signals may then be summed. For example, if there are three transmit sources (with unknown locations) at DOA 10°, 30°, 50° and 16 elements in the array. There would be three weight vectors, which essentially point at 10°, null 30° and 50°
point at 30°, null 10° and 50°
point at 50°, null 10° and 30°.

Each weight vector would have 16 complex numbers (one for each antenna element). It can be thought of as the weight vectors resulting in a coherent sum for desired signals while signals from interfering directions are cancelled; this improves SINR.

Those skilled in the art will recognize that the present invention does not require calculation of a covariance matrix (as required by MMSE). In digital beamforming techniques, for example, where MMSE is commonly utilized, the inverse of the covariance matrix is multiplied by a cross-correlation vector to obtain a weight vector. In accordance with the present invention, the covariance matrix is not calculated (as required under MMSE) but estimated from cross-correlation results.

Utilizing MMSE, a covariance matrix must be calculated, correlating the signal at element one with that at element two; signal at element one with that at element three, signal at element one with that at element four . . . and so on until a matrix is constructed. This would require $N^2$ correlations, but this number can be reduced using Hermitian symmetry, to the diagonal and upper triangle, or $N^2/2+N/2$ correlations for an array of N elements. The present invention avoids the requirement to perform these correlations.

In instances where the operating environment includes an interferer that is not detected, such as a jammer that does not transmit an expected sync sequence, then the present invention will not reduce the interference caused by this source. Thus, by example, while the jamming signal is ignored under an embodiment of the present invention, the jamming signal may still interfere with desired signals. However, SINR is increased if the covariance matrix is generated with the jammer present.

Likewise, in a known jamming signal environment the antenna array of the present invention may be utilized to additionally perform interference cancellation of the jammer with given restrictions the array must be calibrated
the DOA of the jammer must be measured or estimated.

By calibrating the array, a steering vector for some DOA can be calculated. Recall that the cross correlation results essentially serve to provide steering vectors used to calculate the weight vector. Given the calibration information is applied to the cross correlation results, the steering vector of the jammer(s) could be additional columns of cross correlations that are used to calculate the 'idealized' covariance matrix. The resulting weight vectors would, when possible, place a null at the DOA associated with the jammer.

Obtaining a steering vector for the jammer may be the result of side information; some other apparatus identifies the location of the jammer, and that information is used with positional information to infer the DOA of the line of sight (LOS) signal from the jammer to the array. Another potential method to detect the presence of interference would be to scan a DOA grid covering the array's field of view, in order to create a power surface. The power surface peaks of non-jammers would correspond to the DOA implied by a source's cross correlation vector. Power surface peaks not associated with a cross correlation vector, could be assumed to be jammers.

Systems and apparatuses in accordance with various aspects of the present invention provide a system and method for digital beamforming. In this regard, the present invention may be described herein in terms of functional block components and various processing steps. It should be appreciated that such functional blocks may be realized by any number of hardware, firmware, and/or software components configured to perform the specified functions. For example, the present invention may employ various integrated circuit components, e.g., memory elements, digital signal processing elements, look-up tables, and the like, which may carry out a variety of functions under the control of one or more microprocessors or other control devices. Such general techniques and components that are known to those skilled in the art are not described in detail herein. Furthermore, although the invention is frequently described herein as pertaining to digital beamforming, it will be appreciated that the systems and methods described herein could also be applied to any signal transmission systems and methods.

It is understood that the specific order or hierarchy of steps in the foregoing disclosed methods are examples of exemplary approaches. Based upon design preferences, it is understood that the specific order or hierarchy of steps in the method may be rearranged while remaining within the scope of the present invention. The accompanying method claims present elements of the various steps in a sample order, and are not meant to be limited to the specific order or hierarchy presented.

Various embodiments of the present invention include one or more techniques described below relating to digital beamforming. Each of these techniques may be implemented using standard user interface techniques, such as standard graphical software programming or the like. Of course any programming language or environment could be used to implement the techniques described herein. Furthermore, the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

The invention claimed is:

1. An apparatus, comprising:
an antenna array having at least three elements for receiving a transmission from at least one source in a simultaneous transmission environment;
a signal processor operatively coupled to said antenna array, said signal processor for receiving a signal from each of said at least three antenna array elements, said signal processor including:
a first process for producing a cross correlation vector for said at least one source on each signal from each of said at least three antenna array elements;

a second process for producing a column vector for said at least one source utilizing said cross correlation vectors for said signals from each of said at least three antenna array elements;

a third process for producing a conjugate transpose of a matrix comprising said column vectors for said at least one source;

a fourth process for producing an idealized covariance matrix from the matrix comprising said column vectors for said at least one source and said conjugate transpose of said matrix comprising said column vectors for said at least one source;

a full rank forcer for producing a weight vector for said at least one source from said idealized covariance matrix; and a controller utilizing said weight vector for said at least one source to at least partially cancel another source transmitting within the simultaneous transmission environment.

2. The apparatus of claim 1 wherein said antenna is a phased array antenna.

3. The apparatus of claim 2 wherein said phased array antenna is un-calibrated.

4. The apparatus of claim 3 wherein said phased array antenna has unknown antenna geometry.

5. The apparatus of claim 1 wherein said antenna controller includes a digital beamformer.

6. The apparatus of claim 1 wherein said cross correlation includes gain and phase differences between correlation results at different antenna elements.

7. The apparatus of claim 6 wherein amplitude differences are substantially equal to antenna calibration error.

8. The apparatus of claim 6 wherein said idealized covariance matrix includes at least one of antenna geometry, direction of arrival, and antenna calibration error.

9. The apparatus of claim 1 wherein said idealized covariance matrix is generated by utilizing complex multiplication.

10. The apparatus of claim 9 wherein said idealized covariance matrix for each source is derived by multiplying each source cross correlation vector by the conjugate transpose of each source cross correlation vector.

11. The apparatus of claim 10 wherein said idealized covariance matrix for each source is summed to produce a weight vector.

12. The apparatus of claim 1 wherein said cross correlation for each source is utilized to generate a $N_{element} \times N_{tx\_src}$ matrix from the cross correlation results and then multiplying by its conjugate transpose to generate an $N_{element} \times N_{element}$ ideal covariance matrix.

13. The apparatus of claim 12 wherein said ideal covariance matrix is full rank.

14. The apparatus of claim 13 wherein said full rank is forced by adding a value to the diagonal.

15. The apparatus of claim 14 wherein said added value is between $\frac{1}{500}$ and $\frac{1}{1500}$.

16. The apparatus of claim 1 wherein said covariance matrix is inverted.

17. The apparatus of claim 16 wherein said covariance matrix is the pseudo-inverse of said signal cross correlations.

* * * * *